United States Patent [19]

Fredriksson

[11] 4,280,728
[45] Jul. 28, 1981

[54] GRAB HOOK

[75] Inventor: Lars O. A. Fredriksson, Växjö, Sweden

[73] Assignee: K A Bergs Smide AB, Gemla, Sweden

[21] Appl. No.: 95,949

[22] Filed: Nov. 20, 1979

Related U.S. Application Data

[63] Continuation of Ser. No. 894,483, Apr. 7, 1978.

[30] Foreign Application Priority Data

Apr. 20, 1977 [SE] Sweden .............................. 7704493

[51] Int. Cl.³ .............................................. B64D 17/38
[52] U.S. Cl. ................................ 294/78 R; 294/82 R; 24/230.5 R
[58] Field of Search ...................... 294/78 R, 82 R, 85, 294/74; 24/230.5 R; 59/93

[56] References Cited

U.S. PATENT DOCUMENTS

| | | | |
|---|---|---|---|
| 3,741,599 | 6/1973 | Drayton | 294/82 R |
| 4,070,823 | 1/1978 | Schreyer et al. | 294/82 R |
| 4,149,369 | 4/1979 | Smetz | 294/82 R |

Primary Examiner—James B. Marbert
Attorney, Agent, or Firm—Holman & Stern

[57] ABSTRACT

A grab hook for shortening a chain or for forming a sling therein comprises a shank portion with an upper suspension end, a point portion and an intermediate bridge portion. Shank portion and point portion are separated by an arcuate chain link introduction opening having substantially parallel edges and ending at the bridge portion. To make the hook suitable for short link chains as well as for long link chains the bridge portion is laterally displaced with respect to the suspension end, and on one side of the hook the edges of the introduction opening widen into arcuate recesses in the shank portion and the point portion, respectively. These recesses end in shelves which are located above the top side of the bridge portion and are adapted to support a chain link.

5 Claims, 17 Drawing Figures

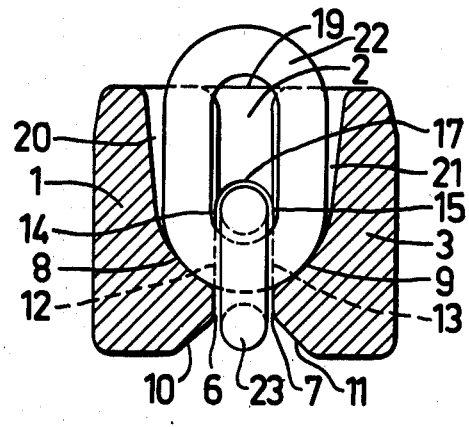
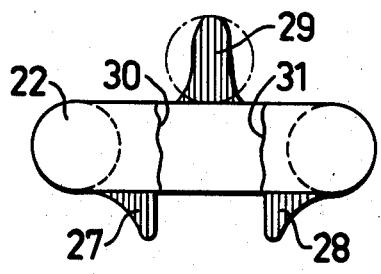
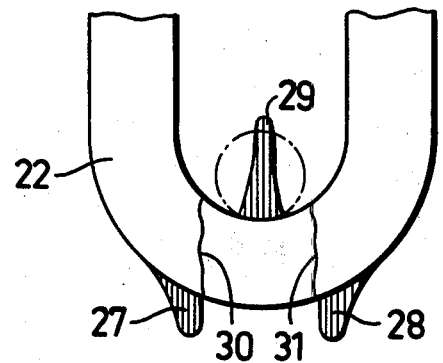
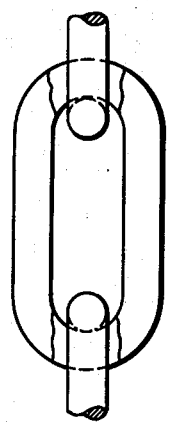

GRAB HOOK

This is a continuation of application Ser. No. 894,483, filed Apr. 7, 1978.

BRIEF SUMMARY OF THE INVENTION

This invention relates to a grab hook for shortening a chain or for forming a sling therein which comprises a shank portion with an upper suspension end, a point portion and an intermediate bridge portion, said shank portion and point portion being separated by an arcuate chain link introduction opening having substantially parallel edges and ending at the bridge portion.

Many different kinds of grab hooks have been used which are intended for rapid adjustment of the length of a chain or for forming a slip-free chain sling. Thus, a similar grab hook is disclosed in the German Offenlegungsschrift No. 2 310 344.

FIGS. 1 and 2 illustrate another example of a known grab hook of this kind in side view and front view, respectively. The grab hook is substantially U-shaped and has a shank portion 1, a bridge portion 2 and a point portion 3, which continuously merge into each other in the order stated. In its other end the shank portion is terminated by a coupling means 4, e.g. an eye or a fork. Shank portion, bridge portion and point portion define an introduction opening 5, which in its entire length has a substantially constant width which is a little larger than the wire diameter of a chain to be introduced into the hook. In use, a chain link always stands near the bottom of the introduction opening, as shown in FIG. 2.

From FIG. 3 it is obvious how the upstanding link 22 becomes deformed when the chain is loaded with a force Z. This is due to the fact that the upward supporting force from the bridge portion 2 is not located just opposite the point of attack of the force Z. This type of grab hooks is therefore critically dependent of the length of the chain links for avoidance of deformations of the chain.

Depending upon the type on grab hook, the chain link may either bear against the bridge portion 2, as shown in FIGS. 1 and 2 (Swedish Pat. No. 336 883) or alternatively float just above, as is illustrated in FIG. 4, which shows another grab hook (Swedish Pat. No. 355 789), in which the shaft portion 1 and the point portion 3 widen adjacent to the bridge portion 2, and the preceeding link 23 and the following link 24, respectively, transfer the force to the grab hook.

In respect of a grab hook according to FIG. 4, which is a front view, partly in section, and in which the upright link 22 in the introduction opening does not engage the bridge portion 2, this chain link is subjected mainly to three forces according to FIGS. 4 and 5, viz. two forces P and Q, which are created by wedge action on the two links 23 and 24 which are located on opposite sides of the grab hook, and the effective transmitted tractive force Z. Decomposition of the forces into components perpendicular to and parallel to the longitudinal direction of the link, respectively, and equilibrium between the forces lead to the following equations, in which the designations are apparent from FIG. 5:

$$P_2 = Z_2$$

$$Q = P_1 + Z_1$$

The geometrical relations between the forces show that the tractive force Q in the chain link 22 is about 2-3 times as great as the effective transmitted tractive force Z. In order not to overload the chain link in the grab hook it is thus necessary to reduce the maximum tractive force permitted to no more than 50% of normal load.

Furthermore, so called shortening claws according to FIGS. 6 and 7 are known.

Examples hereof are shown in the German Pat. No. 1 775 813. FIGS. 6 and 7 are a plan view and a side view, respectively, partially in section, of the said claw. In FIG. 7 those forces P and Z are shown, to which the chain link 22 is subjected. Particularly in respect of long link chains the force P tends to bend the chain link 22, which means that this type of shortening claws can be considered suitable only for short link chains.

FIG. 8 illustrates how a grab hook or shortening claw can be used for forming a slip-free chain sling for lifting bar stock of different kinds, or the like. On such occasions the angle a can often become big (90°-120°), which entails an unfavourable strain in the chain link resting in the shortening claw.

As is apparent from the above, grab hooks or shortening claws of the prior art suffer from drawbacks in the form of unfavourable strain in the chain links, which leads to a deformation thereof and to the necessity of discarding the chain. Alternatively, it is possible to reduce the maximum load permitted for the chain for obviating damages to the links and for obtaining a satisfactory safety. In particular, grab hooks of the prior art are dependent of the length of the chain links for their function and are normally only adapted to short link chains for lifting purpose.

The principal object of the invention is to eliminate the above drawbacks and to provide a grab hook or shortening claw which is particularly suited for chain links of different lengths.

With this object in view each of the edge surfaces of the introduction opening has an arcuate portion having its one end directed substantially towards the suspension end of the hook and its other end directed substantially towards the bridge portion, which is laterally displaced with respect to the suspension end of the shank portion, substantially perpendicularly to a plane through the suspension end and those portions of the edge surfaces which are located nearest to said suspension end. Two three-dimensional, lateral surfaces which are arcuate in cross section and belong to the shank portion and the bridge portion, respectively, each joins one individual one of the edge surfaces of the introduction opening along the major part of the extension of the edge surfaces and diverge from each other, as counted from the edge surfaces, in sectional planes perpendicular to the introduction opening and each develops into a support surface or shelf, respectively. Said shelves which are adapted to support two mutually opposite portions of a chain link are substantially parallel to each other and are located substantially on the same level as the arcuate portion of the introduction opening, above the upper side of the bridge portion.

According to another aspect the grab hook according to the invention is provided on one hand with a first recess for a first chain link which is substantially vertical when the grab hook is suspended in its suspension end and is formed on one side of the hook in one end of said bridge portion, which is laterally displaced with respect to the suspension end, and on the other hand with second recesses having arcuate cross sections and adjoining the edges of the introduction opening and being formed on the opposite side of the hook in the shank portion and the point portion, respectively. These second recesses end in two shelves which are substantially horizontal when the hook is suspended in its suspension end, and are located above said bridge portion on opposite sides of said introduction opening for supporting a second chain link adjoining and directly connected to said first chain link.

Further features and advantages of the grab hook according to the invention will become apparent from the following detailed description and the annexed drawings in which FIGS. 9 and 17 as nonlimiting examples illustrate a grab hook according to the invention and its application.

BRIEF DESCRIPTION OF THE DRAWINGS

FIG. 12 is a sectional view on line II—II in FIG. 11.

FIG. 14 is an end view on the sectional line III—III in FIG. 13 of a chain link inserted into the grab hook and illustrates among other things the contact pressure and the cross sections of the link which are subjected to maximum shearing stress in a load case.

FIG. 5 is an oblique side view on the sectional line III—III in FIG. 13 of a chain link inserted into the grab hook, and discloses among other things the contact pressure and the cross sections of the link which are subjected to maximum shearing stress.

FIG. 16 illustrates locations of rupture at straight loading of a chain link.

DETAILED DESCRIPTION

Figure 9:
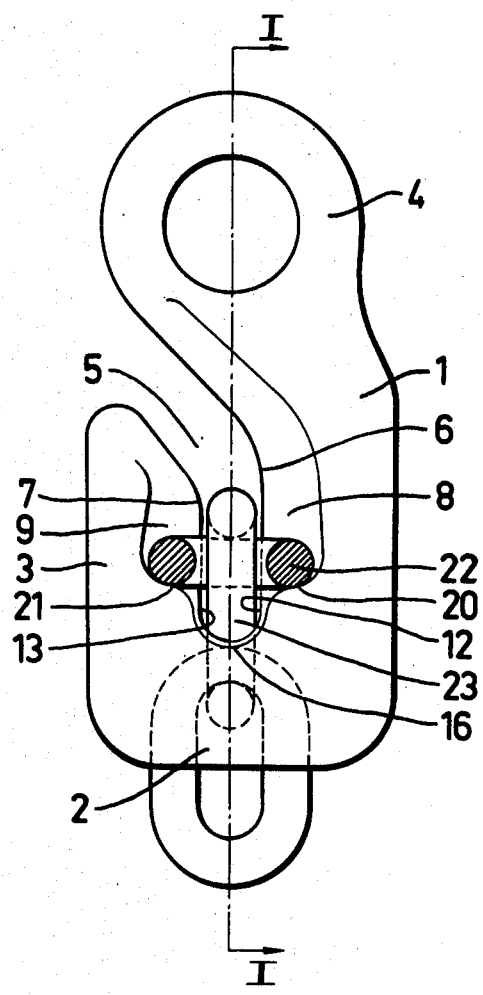
FIG. 9 is a front plan view of a grab hook according to the invention into which a chain has been inserted.

This invention relates to a grab hook consisting of a shank portion 1, a bridge portion 2 and a point portion 3, which continuously emerge into each other. In its upper end the shank portion is terminated by a connecting means or a suspension end 4. In relation to the suspension end 4 the bridge portion 2 is laterally displaced in the plane I—I perpendicularly to the plan view of FIG. 9. Shaft portion, bridge portion and point portion define an open, elongated introduction opening 5, which has a substantially constant width along its entire extension (FIG. 9). Those areas of the shaft portion and the point portion which face the introduction opening 5 are comprised partly of the edge surfaces 6 and 7 of the introduction opening 5, which belong to the shank portion 1 and the point portion 3, respectively, and on the other hand of side surfaces 8, 9 and 10, 11 which are arcuate in cross-section and are located on opposite sides of the edge surfaces (FIGS. 10 and 12).

The edge surfaces 6, 7 of the introduction opening 5 which are substantially parallel to each other, are arcuate as well inside of the open end of the introduction opening 5 in the plan view according to FIG. 9 as perpendicularly thereto in the plane I—I. After the last-mentioned bend, which comprises approximately 90° and is designated with 26 in FIG. 10, the edge surfaces emerge into two wider portions 12, 13 which are directed towards the bridge portion 2 and widen further, as is shown at 14 and 15, respectively, and emerge into or end in the sides 16, 17 of the bridge portion 2, which face the introduction opening. These widened portions 14, 15 form a first recess on one side of the hook in one end of the bridge portion 2.

Figure 10:
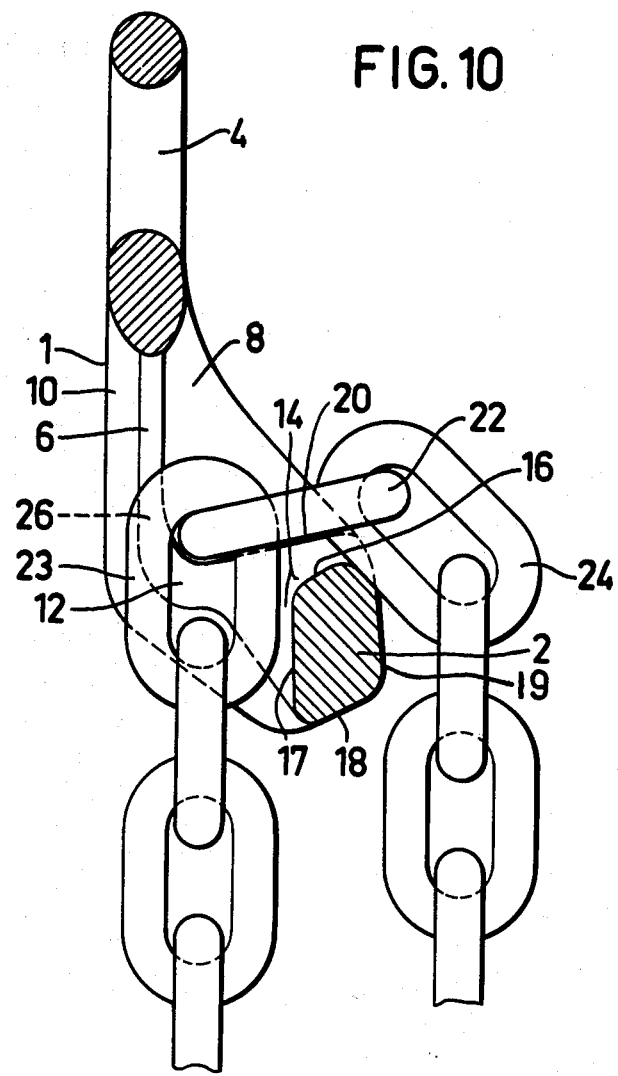
FIG. 10 is a sectional view on line I—I in FIG. 9.

As is most clearly apparent from FIG. 10, the bridge portion substantially has the shape of a parallelogram having rounded corners and two sides 18, 19 (FIG. 10) which face away from the introduction opening.

The side surfaces 8, 9 are concave and diverge from each other, as counted from the edge surfaces, in sectional planes which are perpendicular to the introduction opening, and each emerge into a support surface or shelf 20 and 21, respectively, and define second recesses which are so dimensioned that a short link chain easily may be introduced into the introduction opening (FIG. 12). The support surfaces 20, 21 are substantially parallel or coplanar with respect to each other and are located on the same level as the arcuate portion of the introduction opening, above the upper side 16 of the bridge portion 2. The side surfaces 8, 9 which form the second recesses in the shank portion 1 and the point portions 3, respectively, on the opposite side of the hook, form together with the introduction opening 5 a pocket or the like having a greatest depth which approximately corresponds to the mutual lateral displacement between the bridge portion 2 and the shank portion 1 and having a mean width which is approximately three times greater than that of the introduction opening. As is apparent from FIG. 12 and as seen in a plan view, the pocket with respect to shape and size substantially equals a plan view of such chain links for which the grab hook is intended. In order to fit the intended chain links each of the support surfaces 20, 21 suitably has a mean width which is approximately at least as large as that of the introduction opening 5. Furthermore the support surfaces preferably form an acute angle, e.g. 75°-90° with that portion of the introduction opening which is located between the bend 26 and the open end. In other words the support surfaces slope towards the portions 12, 13 of the edge surfaces in such a way, that the chain link 22 resting upon the support surfaces tends to slide down towards those areas of the side surfaces 8, 9 of the recesses which are located closest to said portions 12, 13. Upon loading the link 23 located in the introduction opening 5, the link 22 is thus fixed in a determined position in the pocket. This position is located so deep in the pocket that the link 23, when it upon loading adjusts itself in the direction of traction, either does not engage the side 17 of the bridge portion 2 which faces the introduction opening or slightly touches it with its longitudinal side. In contradistinction to common types of grab hooks the link 23 located in the introduction opening does thus not engage the grab hook or is in very light contact therewith.

Furthermore, the link 23 may adjust itself completely in the load direction and is accordingly loaded exactly as any other link in the chain. The link 22 which is located in the pocket is on opposite sides of the point of load of the link 23 supported by the side surfaces 8, 9 of the recesses, said side surfaces substantially conforming with the outer shape of the link with respect of their radii and giving rise to the least possible strain due to the facts that the force is distributed over a larger contact surface and that the support of the link reaches the border of the wider portions 12, 13 of the edge surfaces 6, 7.

Figure 13:
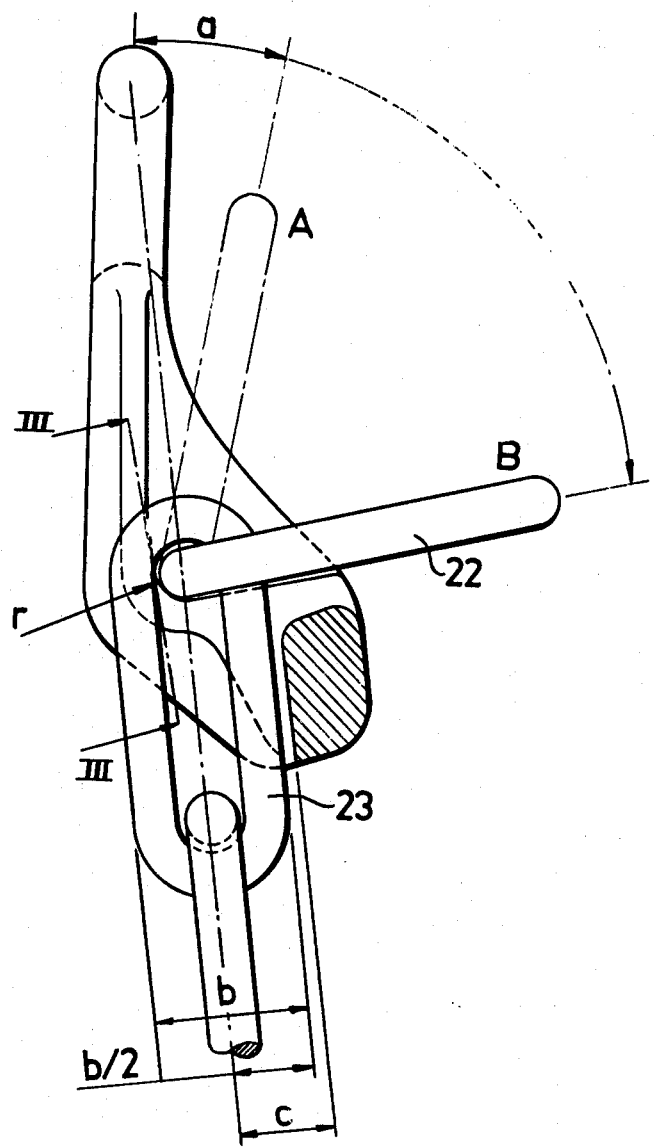
FIG. 13 illustrates in the same way as FIG. 10 the grab hook in which, however, a long link chain is inserted.

As is evident from FIG. 13, which is a cross-sectional view corresponding to FIG. 10 on line I—I including a long chain link inserted in the hook, it is apparent that the link can take different positions, e.g. A and B, which form a relatively great angle with each other.

In FIGS. 14 and 15, which are an end view and a fragmentary side view, respectively, of the link 22 when it is in the position B and A, respectively in FIG. 13, there is illustrated by means of the hatched surfaces 27, 28, 29 how the contact pressure is distributed over the link. In these Figures the cross sections which are subjected to the highest shear strain have been indicated by wave lines 30, 31.

When studying FIGS. 14 and 15 it is apparent that the surfaces 30, 31 of the chain link 22 which are subjected to the highest shear strain coincide with the positions of those surfaces which are subjected to the greatest shear strain at ordinary tractional loading of the chain link.

FIG. 16 discloses positions of rupture at straight loading of a chain link until rupture occurs. This indicates that the chain link 22 in the grab hook substantially equals any other link in the chain from the loading point of view.

Figure 1:
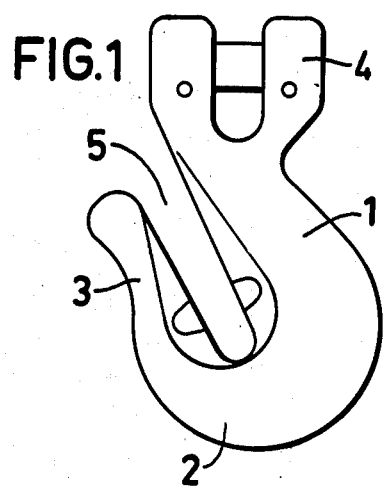
FIGS. 1-8 illustrate examples of known grab hooks and their application, as has become apparent already from the above.
Figure 2:
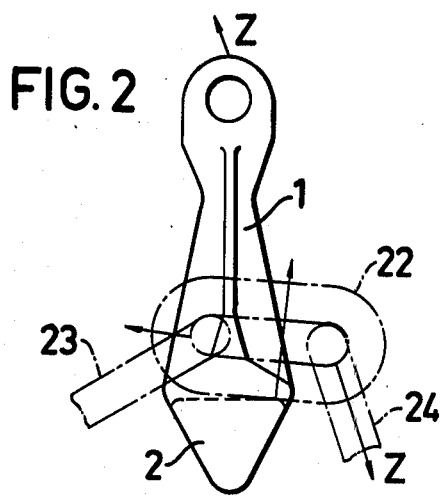
Figures 3, 4:
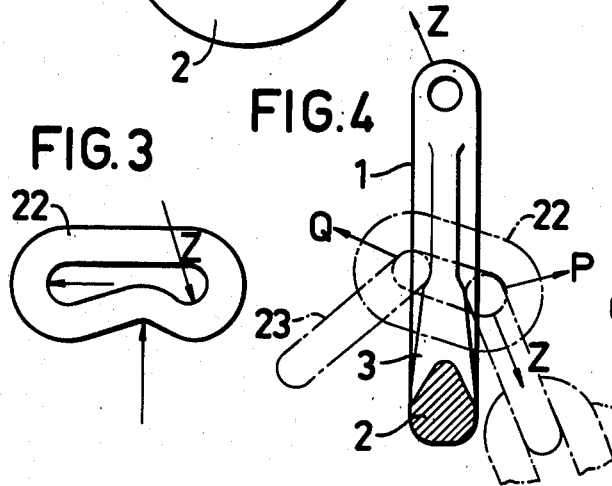
Figure 5:
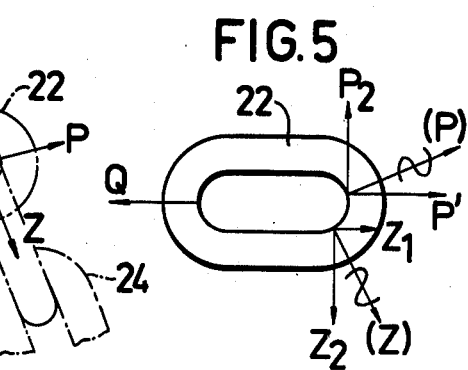
Figure 7:
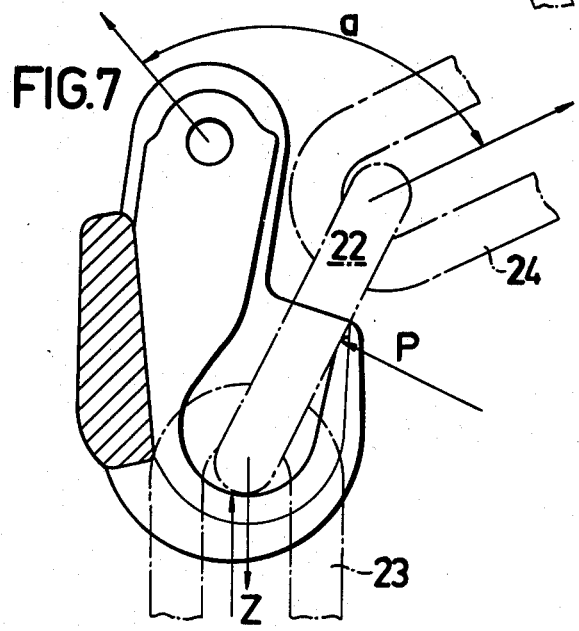
Figure 6:
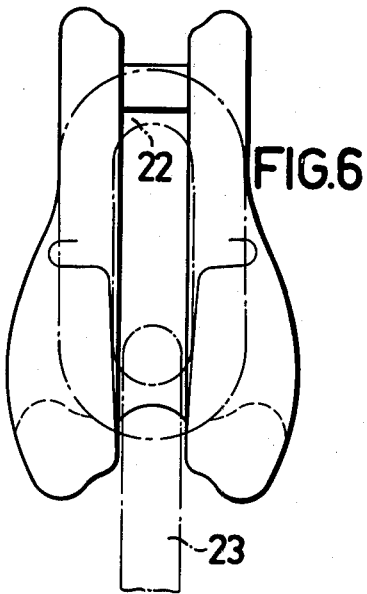
Figure 11:
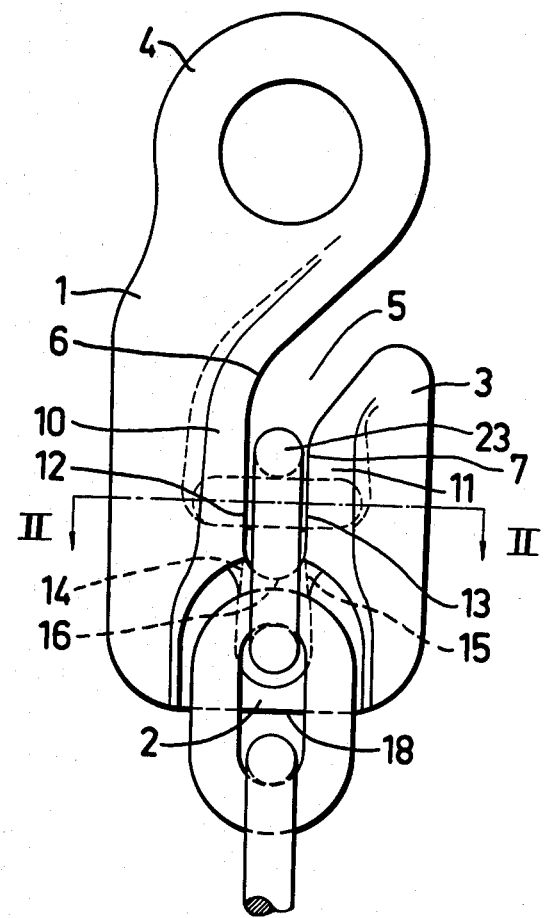
FIG. 11 is a plan view corresponding to FIG. 9 and illustrating the hook as seen from the opposite side.
Figure 8:
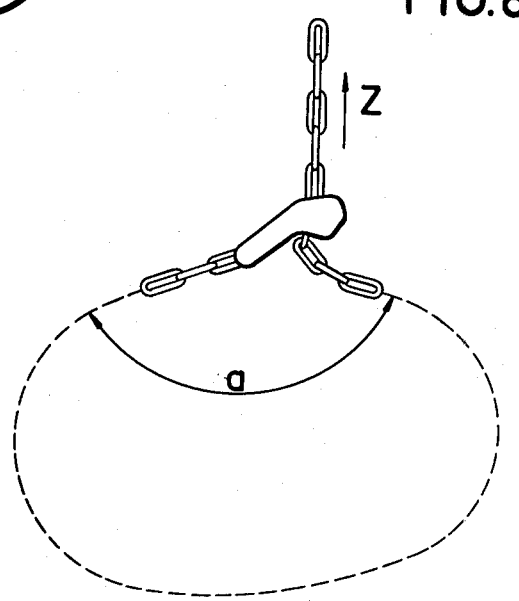
Figure 17:
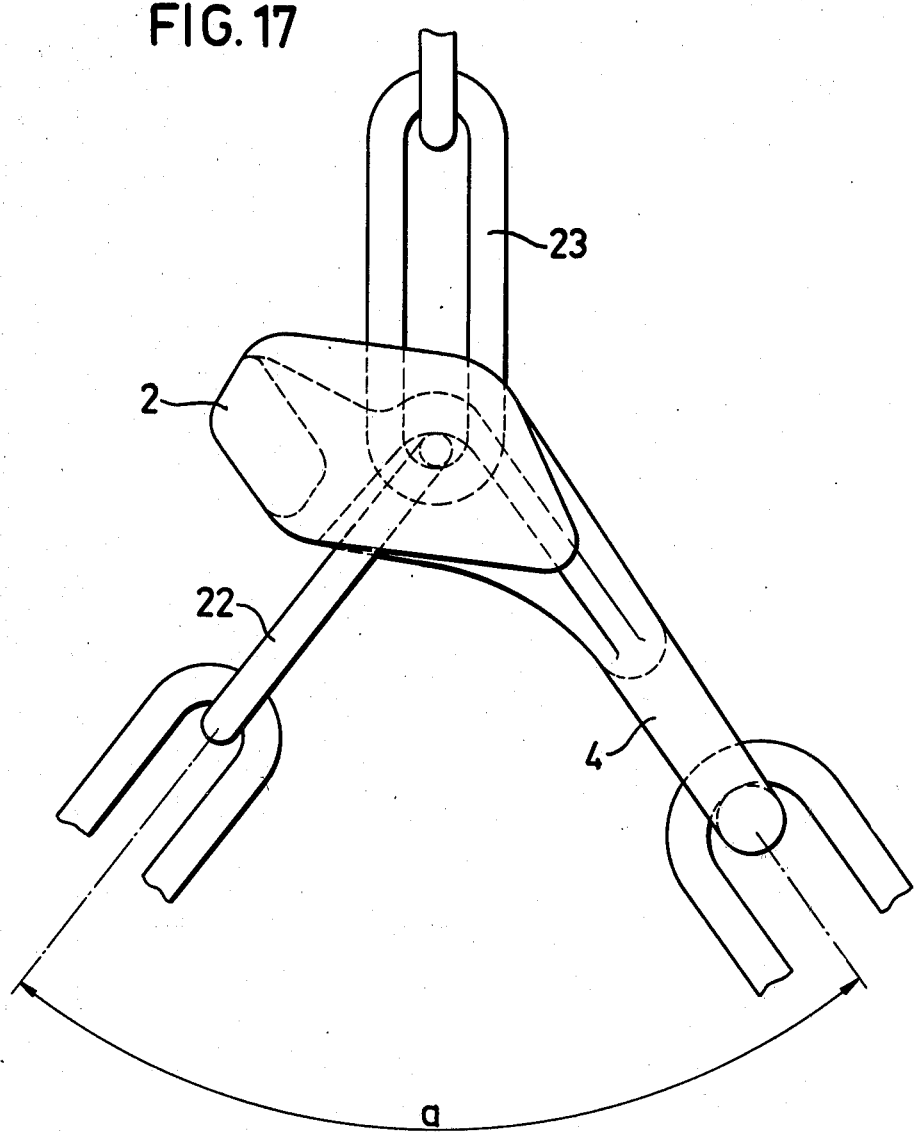
FIG. 17 illustrates part of a slip-free chain sling in the same way as FIG. 8.

The drawback of a shortening claw of known type according to FIGS. 6 and 7 at the formation of a slip-free chain sling according to FIG. 8 as mentioned above is also eliminated by the present invention due to the fact that the angle a of the chain link 22 may be varied within rather wide limits. This is apparent from FIG. 17, which illustrates how the appearing force P according to FIG. 7 completely disappears or gives raise to much smaller strain in the chain link 22, since this link may adjust itself exactly in the direction of traction within rather wide limits or, at an extremely big angle a, may come much closer to the direction of traction than with a shortening claw according to FIG. 7.

The embodiment described above and illustrated in the drawings is, of course, to be regarded merely as a non-limiting example and may as to its details be modified in several ways within the scope of the following claims. Thus, that portion of the introduction opening 5, which is located between its mouth and its bend 26, may be substantially straight instead of arcuate.

Furthermore, the cross section of the bridge portion may have another shape than that of a parallelogram, e.g. circular, triangular, elliptical and so on.

Furthermore, the support surfaces 20, 21 may form a greater as well as a smaller angle than 75°-90° with that portion of the introduction opening which is located between the bend 26 and the open end.

What I claim is:

1. Grab hook for connection to a chain, the hook being unsymmetrical and comprising a shank portion with a suspension end, a point portion and a bridge portion interconnecting said shank portion with said point portion and together with said shank and point portions defining an elongated introduction opening, said opening having an open end for receiving a chain link and an inner closed end defined by the bridge portion, said opening having two mutually substantially parallel edge surfaces defined by the shank portion and the point portion, respectively, each of said edge surfaces having an arcuate configuration with one end directed substantially towards the suspension end of the hook and its other end directed substantially towards the bridge portion, each of said shank portion and said bridge portion having a three-dimensional, lateral surface which is arcuate in cross section and extends from the respective edge surface of the introduction opening along the major portion of the extension of the edge surfaces and diverges from said respective edge surfaces of the introduction opening, in sectional planes perpendicular to the introduction opening and each of which lateral surfaces ends in a support shelf extending substantially perpendicularly from said opening, said bridge portion being laterally displaced with respect to the suspension end of the shank portion, substantially perpendicularly to a plane through the suspension end and the point portion, said shelves being substantially coplanar and adapted to support two mutually opposite portions of the same chain link and located above the upper side of the bridge portion and above said closed end of the introduction opening, which is three-dimensional and extends in two mutually perpendicular planes.

2. Grab hook according to claim 1, wherein the lateral surfaces and the support shelves together with the introduction opening form a pocket having a depth which substantially corresponds to the mutual lateral displacement between the bridge portion and the shank portion and having a mean width which is about three times wider than that of the introduction opening.

3. Grab hook according to claim 1, wherein the support shelves form an acute angle with a portion of the introduction opening which is located nearest to the suspension end of the shank portion.

4. Grab hook according to claim 1, wherein each of the support shelves has a mean width which is at least as large as that of the introduction opening.

5. Grab hook according to claim 2, wherein the perpendicular distance from a line, which corresponds to the normal tensional direction, through the suspension end and the bottom of the pocket, to the nearest portion of the inside of the bridge is a large as, or larger than, half of the outer width of the chain for which the grab hook is intended.

* * * * *